Figures 1, 2:
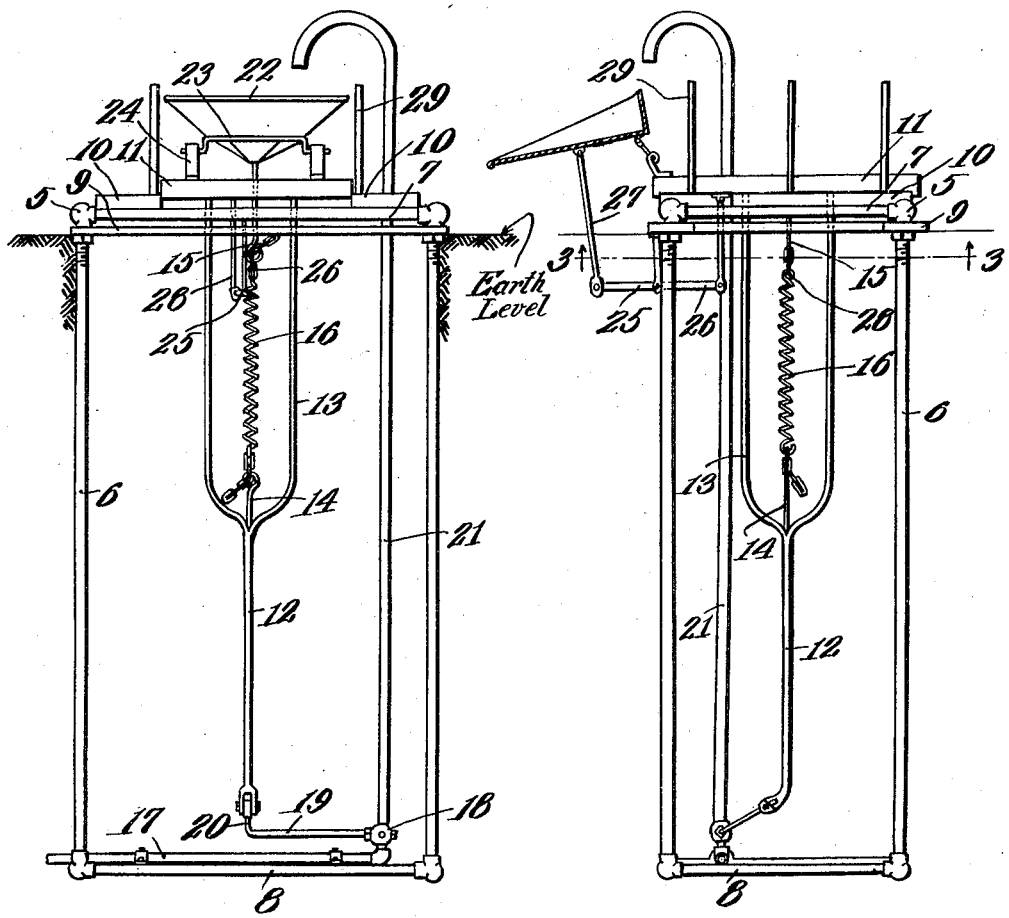

S. H. PERRY.
AUTOMATIC WATERING TROUGH.
APPLICATION FILED MAR. 10, 1913.

1,092,387.

Patented Apr. 7, 1914.
2 SHEETS—SHEET 1.

Witnesses

S. H. Perry,
Inventor
by C. A. Snow & Co.
Attorneys

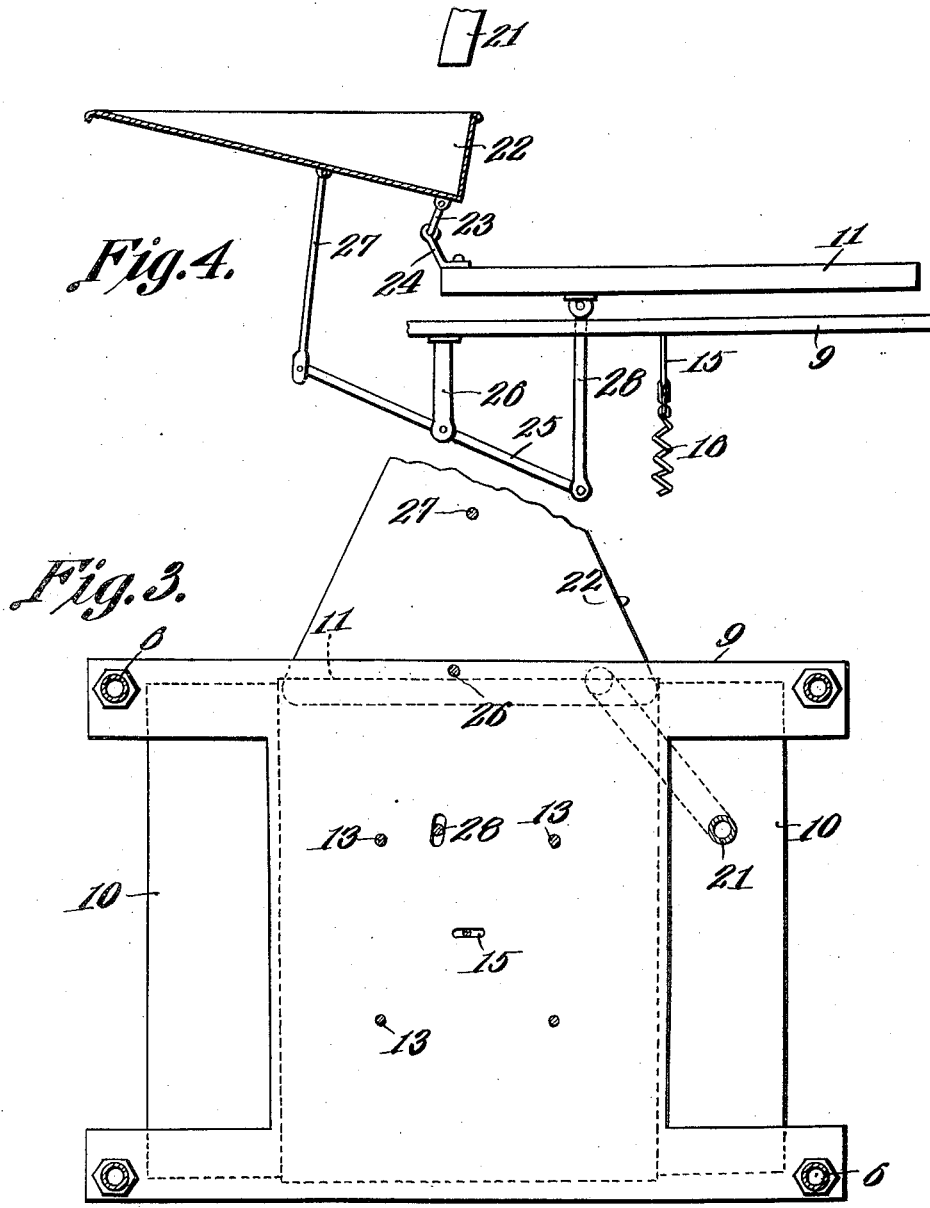

UNITED STATES PATENT OFFICE.

SAMUEL H. PERRY, OF YORK, NEBRASKA.

AUTOMATIC WATERING-TROUGH.

1,092,387.           Specification of Letters Patent.       Patented Apr. 7, 1914.

Application filed March 10, 1913. Serial No. 753,339.

*To all whom it may concern:*

Be it known that I, SAMUEL H. PERRY, a citizen of the United States, residing at York, in the county of York and State of Nebraska, have invented a new and useful Automatic Watering-Trough, of which the following is a specification.

The present invention appertains to an automatic and sanitary watering trough for farm stock, such as hogs and other animals.

It is the object of the present invention to provide a trough which shall normally be disposed in such a position so that its contents will be discharged, and to provide means whereby when the animal approaches the trough, the trough will be brought to a position to retain its contents and shall be filled or partially filled with water, and whereby when the animal recedes or retires from the trough, the trough will again be brought in a position to discharge its contents and the flow of water will be cut off.

With this general object in view in connection with other objects which will appear as the nature of the invention is better understood, the invention resides in the combination and arrangement of parts and in the details of construction hereinafter described and claimed, it being understood that changes in the precise embodiment of the invention herein disclosed can be made within the scope of what is claimed without departing from the spirit of the invention.

The present invention has been illustrated in its preferred embodiment in the accompanying drawings, wherein:—

Figure 1 is a front view of the apparatus. Fig. 2 is side elevation thereof, parts being shown in section. Fig. 3 is an enlarged sectional view taken on the line 3—3 of Fig. 2. Fig. 4 is an enlarged fragmental detail showing the trough in level position or in position to retain its contents.

In carrying out the invention, reference being had to the drawings, the apparatus is preferably supported by a frame, designated generally by the numeral 5, and including the corner posts or uprights 6 connected at their upper and lower ends with the rectangular sections 7 and 8, respectively. A plate 9 is mounted on the uprights 6 adjoining or directly below the upper section 7, and is maintained in position in any desirable manner. The frame 5 is embedded in the soil with the plate 9 at the earth level. On the upper section 7 there are mounted a pair of end pieces 10, between which there is disposed a vertically movable platform 11.

A plunger 12 is disposed within the frame 5 below the platform and is provided with a plurality of branches 13 at its upper end passing slidably through the plate 9 and attached to the platform 11. A hook 14 is provided at the crotch of the branches 13, while a hook 15 is secured centrally to the bottom of the plate 9, a retractile coiled wire spring 16 being adjustably connected at its ends with the hooks 14 and 15 so as to yieldably support the platform 11. It will be apparent that this spring may be adjusted so as to be brought under suitable tension to most effectively support the platform for yielding movements.

The water supply or feed pipe 17, preferably embedded in the soil, enters the frame 5 at its lower end and is provided with a 3-way or "bleed" valve 18, the stem 19 of which has its end bent angularly or into an arm 20 pivotally connected to the lower end of the plunger rod 12, in order that when the plunger rod is depressed, due to the depression of the platform the valve will open to permit the water to flow therethrough. A delivery pipe 21 is attached to the valve 18 and projects upwardly, preferably through one of the end pieces 10 and its upper end is bent into a goose neck to overhang the corner of the trough. The valve 18 is of a 3-way or "bleed" type, in order that when the valve is closed the water or "head" of the water within the delivery pipe 21 will be permitted to drain off so as to avoid freezing.

The water trough or receptacle has been designated by the numeral 22, the same being preferably triangular in contour with one side disposed above the edge of the platform and with the opposite corner projecting from the platform over the soil. The side of the trough that is disposed above the edge of the platform is deepened, the bottom of the trough being inclined upward toward the opposite corner. The side of the trough which is disposed above the edge of the platform, and which may be conveniently termed the inner side, is pivotally mounted on the platform, and to this end, an arch 23 is secured to the bottom of the trough adjoining the inner side, and has its terminals bent into pintles journaled in the eyes of bearings 24 secured to the edge of the platform.

The lever 25 is fulcrumed to a pendent or depending member 26 secured to the plate 9 and has the links 27 and 28 connected to its respective arms, the link 27 being pivoted to the bottom or free portion of the trough and the link 28 passing through the plate 9 being pivoted to the platform 11. Thus it will be evident that when the platform is depressed, the inner side of the trough will be depressed therewith, and the lever 25 will be swung so as to raise the outer corner of the trough, and conversely, as the platform is raised, the inner side of the trough will be raised and the outer corner will be lowered.

In order to properly direct the animals onto the platform 11, a series of guards 29 are preferably secured to each of the end pieces 10, so that the animals will be constrained to apporach the forward side of the trough.

In use, it will be apparent that when the platform 11 is unoccupied or raised, the trough 22 will be held in declined position, as seen in Fig. 2, so that the water will be discharged therefrom. If desired, a drain may be provided for receiving the waste water that is to be carried off. When an animal approaches the trough and steps upon the platform, the platform will be depressed against the tension of the spring 16, and as a consequence, the valve 18 will be opened so as to permit the water to flow through the delivery pipe 21, and the trough 22 will be brought to a level position so as to catch and retain the water which flows from the pipe 21. Thus, the water that is delivered to the trough will be fresh and after the animal has partaken of the water and retired from the trough, the platform will be raised through the medium of the spring 16 so that the trough will again be brought to a declined position, and the valve 18 will be closed. The valve 18 being closed will permit the head of the water to drain off so as to avoid freezing in cold weather and the trough in being declined will permit its contents to be discharged in order that the contents may not become stagnant.

The device is entirely automatic and is sanitary, the advantages of the device being apparent from the foregoing taken in connection with the drawings.

In applying the device to the soil, it is preferable to dig a suitable hole in the soil, and to line the walls of the hole with cement or concrete, so as to provide a permanent structure to receive the frame of the device and to exclude dirt and other extraneous matter. The water supply pipe will be disposed below the frost line, and it is also preferable to provide a cement pan or supplemental trough to catch the waste water discharged from the aforesaid trough, so as to provide a watering place for chickens, birds and the like. It is also desirable to so fence the device in an inclosure that the trough may only be approached at the proper side, it being noted that the hogs may stand completely on the platform.

What is claimed is:—

1. In a device of the character described, a supporting structure, a yieldable platform thereon, a trough having one side relatively deep and pivoted to one edge of the platform, the trough projecting away from the platform and having its bottom inclined from the said side to the free portion of the trough, means carried by the supporting structure and operatively connecting with the free portion of the trough and the platform, in order that when the platform is depressed and raised, the free portion of the trough will be raised and depressed respectively, a supply pipe overhanging the trough, and means for opening and closing the passage through the supply pipe when the platform is depressed and raised, respectively.

2. In a device of the character described, a supporting structure, a yieldable platform thereon, a trough having one side relatively deep and pivoted to one edge of the platform, the trough projecting away from the platform and the bottom of the trough being inclined from the said side to the free portion of the trough, a lever fulcrumed to the supporting structure, links connecting the respective arms of the lever and the platform and free portion of the trough, a supply pipe overhanging the trough, and means for opening and closing the passage through the supply pipe when the platform is depressed and raised, respectively.

In testimony that I claim the foregoing as my own, I have hereto affixed my signature in the presence of two witnesses.

SAMUEL H. PERRY.

Witnesses:
C. H. KOLLING,
C. T. BREMER.

Copies of this patent may be obtained for five cents each, by addressing the "Commissioner of Patents, Washington, D. C."